(12) United States Patent
Rallings

(10) Patent No.: US 11,091,022 B2
(45) Date of Patent: Aug. 17, 2021

(54) CENTRELESS WHEEL WITH DRIVE

(71) Applicant: Alan Rallings, Dorchester (GB)

(72) Inventor: Alan Rallings, Dorchester (GB)

( * ) Notice: Subject to any disclaimer, the term of this patent is extended or adjusted under 35 U.S.C. 154(b) by 310 days.

(21) Appl. No.: 16/320,318

(22) PCT Filed: Jul. 26, 2017

(86) PCT No.: PCT/GB2017/000116
§ 371 (c)(1),
(2) Date: Jan. 24, 2019

(87) PCT Pub. No.: WO2018/020199
PCT Pub. Date: Feb. 1, 2018

(65) Prior Publication Data
US 2019/0263251 A1    Aug. 29, 2019

(30) Foreign Application Priority Data

Jul. 26, 2016    (GB) .................................... 1612893

(51) Int. Cl.
*B60K 1/00*        (2006.01)
*B60K 7/00*        (2006.01)
(Continued)

(52) U.S. Cl.
CPC .............. *B60K 7/0007* (2013.01); *A61G 5/10* (2013.01); *B60B 19/00* (2013.01); *B60B 27/0021* (2013.01); *B60C 7/00* (2013.01); *B60K 17/356* (2013.01); *A61G 5/04* (2013.01); *B60K 2007/0038* (2013.01); *B60K 2007/0061* (2013.01)

(58) Field of Classification Search
CPC .................... B60K 7/0007; B60K 7/00; B60K 2007/0038; B60K 2007/0061; B60K 17/356; B60C 7/00; B60B 19/00; B60B 27/0021; B60B 3/00; A61G 5/04; A61G 5/041; A61G 5/047
See application file for complete search history.

(56) References Cited

U.S. PATENT DOCUMENTS 5,261,684 A *  11/1993  Soto .......................... A61G 5/00
                                                     280/250.1
6,851,496 B2 *  2/2005  Prucher ................. B60K 7/0007
                                                      180/65.51
(Continued)

FOREIGN PATENT DOCUMENTS

DE    102011117388 A1    5/2013
EP        2127915 A1    12/2009

*Primary Examiner* — James M Dolak
(74) *Attorney, Agent, or Firm* — Richard M. Goldberg

(57) ABSTRACT

A centreless wheel for a vehicle is suitable for use in a road-going vehicle, a wheelchair, a trolley, etc. and includes a rotor that is annular around an axis, the rotor having an inner surface forming a plurality of radial teeth to form an annular gear. The rotor is mounted in a member which is annular around the axis, the member having a housing for a drive mechanism with a driveshaft and a pinion mounted thereon in engagement with the annular gear to transmit torque to the rotor. A connection assembly connects the member to the vehicle. An actuator is configured to act upon the housing to move the member and the rotor relative to the connection assembly.

8 Claims, 8 Drawing Sheets

(51) Int. Cl.
*B60B 19/00* (2006.01)
*B60B 27/00* (2006.01)
*B60C 7/00* (2006.01)
*B60K 17/356* (2006.01)
*A61G 5/10* (2006.01)
*A61G 5/04* (2013.01)

(56) References Cited

U.S. PATENT DOCUMENTS

| | | | |
|---|---|---|---|
| 6,948,578 B2 * | 9/2005 | Prucher | H02K 41/025 180/65.51 |
| 7,240,969 B2 * | 7/2007 | Gu | B60G 3/01 280/229 |
| 7,426,970 B2 * | 9/2008 | Olsen | A61G 5/1059 180/65.1 |
| 7,938,210 B2 * | 5/2011 | Kunzler | B60G 3/01 180/65.51 |
| 8,037,957 B2 * | 10/2011 | Laurent | H02K 7/116 180/65.51 |
| 8,807,254 B2 * | 8/2014 | Manus | B60K 17/043 180/65.51 |
| 9,937,408 B2 * | 4/2018 | Mo | A63C 17/04 |
| 10,093,168 B2 * | 10/2018 | Hays | B60B 1/00 |
| 10,293,676 B2 * | 5/2019 | Schnapp | B62K 11/007 |
| 10,351,190 B2 * | 7/2019 | Lynn | B60L 50/50 |
| 10,892,672 B2 * | 1/2021 | Meinke | H02K 1/27 |
| 10,967,934 B2 * | 4/2021 | Ferguson | B62M 6/65 |
| 2002/0011368 A1 * | 1/2002 | Berg | B60K 7/00 180/218 |
| 2004/0211606 A1 | 10/2004 | Prucher | |
| 2006/0012144 A1 | 1/2006 | Kunzler et al. | |
| 2009/0101425 A1 | 4/2009 | Laurent | |

* cited by examiner

SECTION 5-5

SECTION 6-6

CENTRELESS WHEEL WITH DRIVE

TECHNICAL FIELD

This invention relates to centerless wheels for vehicles that comprise a rotor for engaging with a supporting surface, and a member for connection to a vehicle.

BACKGROUND OF THE INVENTION

Centerless wheels, also known as hubless wheels, have previously been proposed for use in wheeled vehicles, such as motor vehicles, bicycles, or even wheelchairs. They have been used in vehicles as a measure to reduce unsprung weight as they do not require a hub and spoke design. However, efforts to date predominantly focus on replicating the functionality of traditional wheel designs. Opportunities therefore exist to improve the overall performance of the wheel, and the vehicle as a whole by utilising the principles of centerless wheels.

BRIEF SUMMARY OF THE INVENTION

According to the present invention, there is provided a centerless wheel for a vehicle, comprising:
  a rotor that is annular around an axis, and having an outer surface for engagement with a supporting surface, and an inner surface having a plurality of radial teeth to form an annular gear;
  an annular member that is annular around said axis and in which the rotor is mounted, and having a housing for a drive mechanism comprising a driveshaft with a pinion mounted thereon in engagement with said annular gear to transmit torque to the rotor;
  a connection assembly for connecting the member to the vehicle;
  an actuator configured to act upon the housing to move the member and the rotor relative to the connection assembly;
  wherein the housing has a plurality of radial teeth thereon to form a gear, against which said actuator acts to rotate the centerless wheel with respect to the connection assembly.

As the annular member (along with the rotor mounted therein) may be moved relative to the connection assembly, the ride height of the vehicle is adjustable and in an embodiment the actuator can be configured to provide a degree of (potentially active) damping to improve secondary ride.

In an embodiment, the centerless wheel may form part of a larger motorised vehicle such as a road-going motor vehicle. Alternatively, it may form part of a smaller motorised vehicle such as a wheelchair or a trolley, for example.

DETAILED DESCRIPTION OF THE INVENTION

FIGS. 1 & 2

Figure 1:
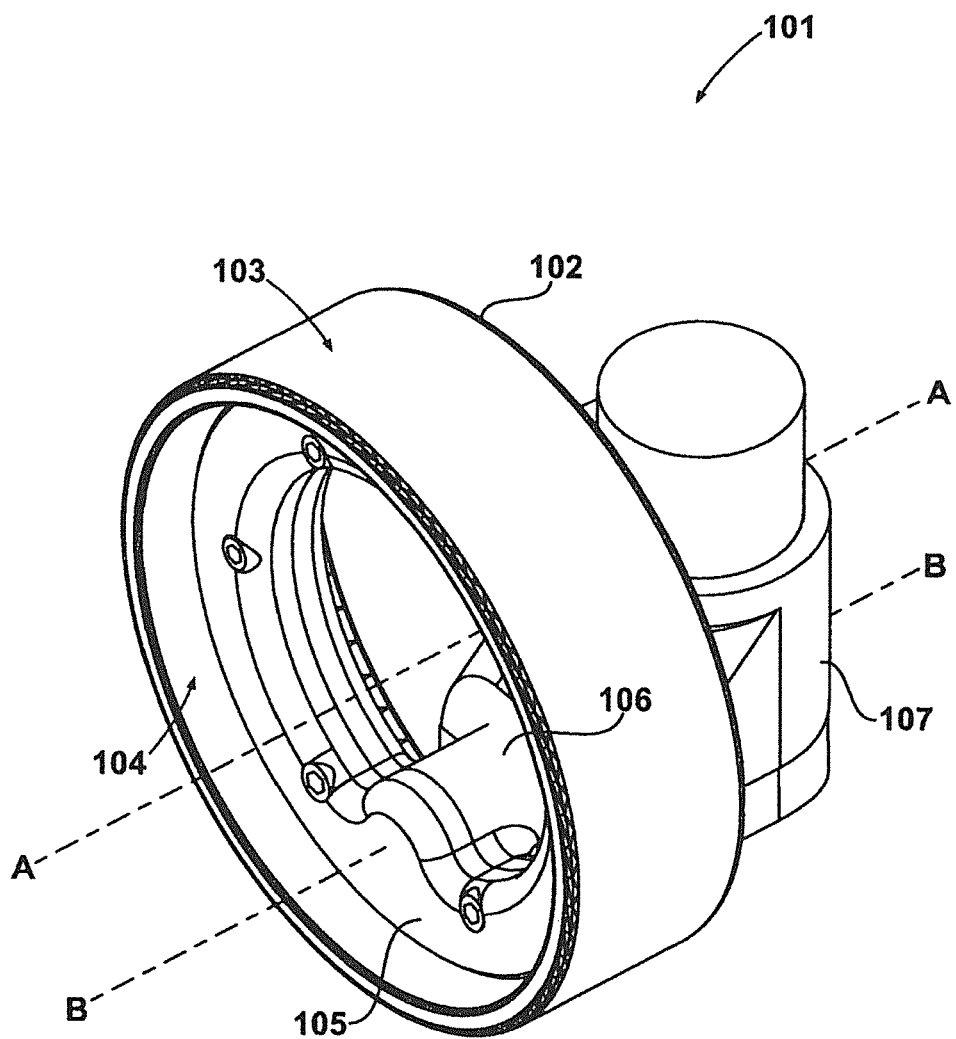
FIG. 1 shows an isometric view of one side of a centerless wheel according to the present invention.
Figure 2:
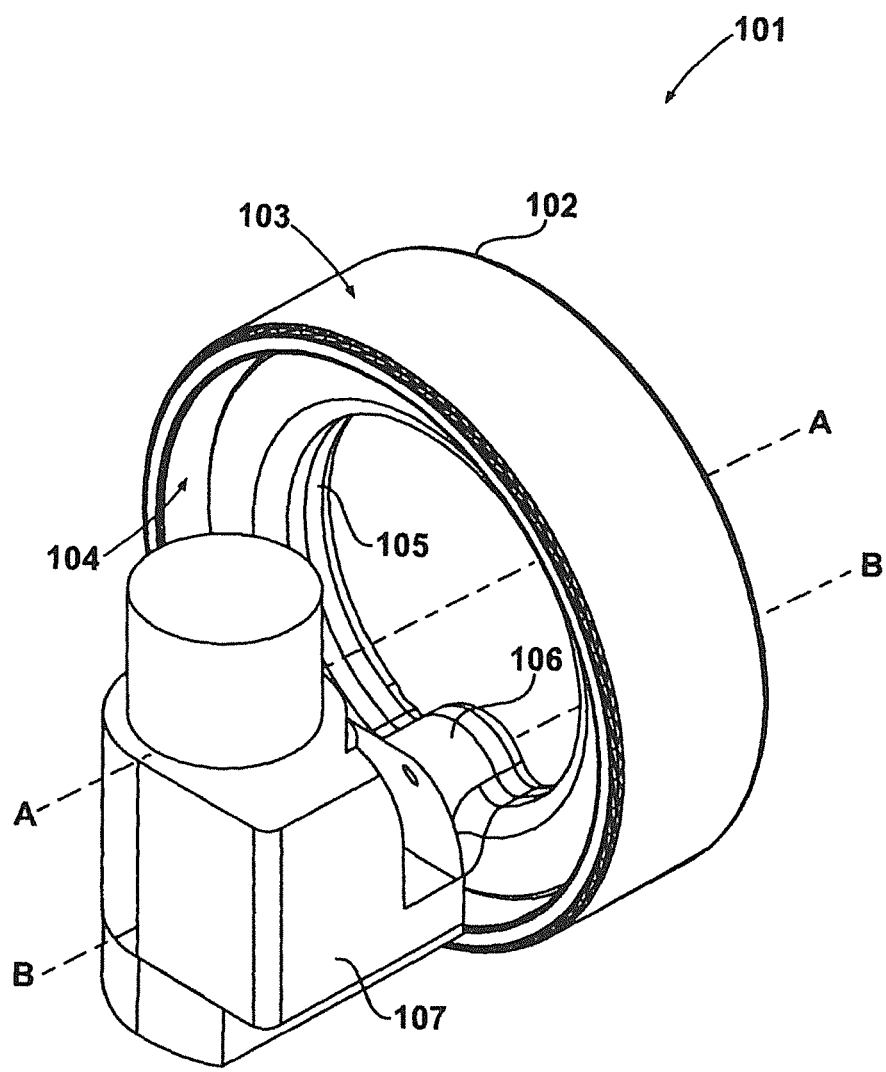
FIG. 2 shows an isometric view of another side of the centerless wheel of FIG. 1.

A centerless wheel 101 according to the present invention is shown in isometric views in FIGS. 1 and 2.

The centerless wheel 101 comprises a rotor 102 that is annular around an axis A-A. The rotor has an outer surface 103 for engagement with a supporting surface, along with an inner surface 104 which engages with a drive mechanism. The engagement of the inner surface 104 with the drive mechanism will be described further with reference to FIGS. 5 and 6. In the present embodiment, the outer surface 103 has a rubber material adhered thereto so as to provide a friction material. Alternatively, a tire could be mounted on the rotor with appropriate configuration in terms of grooves for tire beads and mountings for valves, etc.

The rotor 102 is mounted in a member 105 which is also annular around the axis A-A. The member 105 provides a housing 106 for the drive mechanism, as will be described further with reference to FIG. 3.

Figure 7:
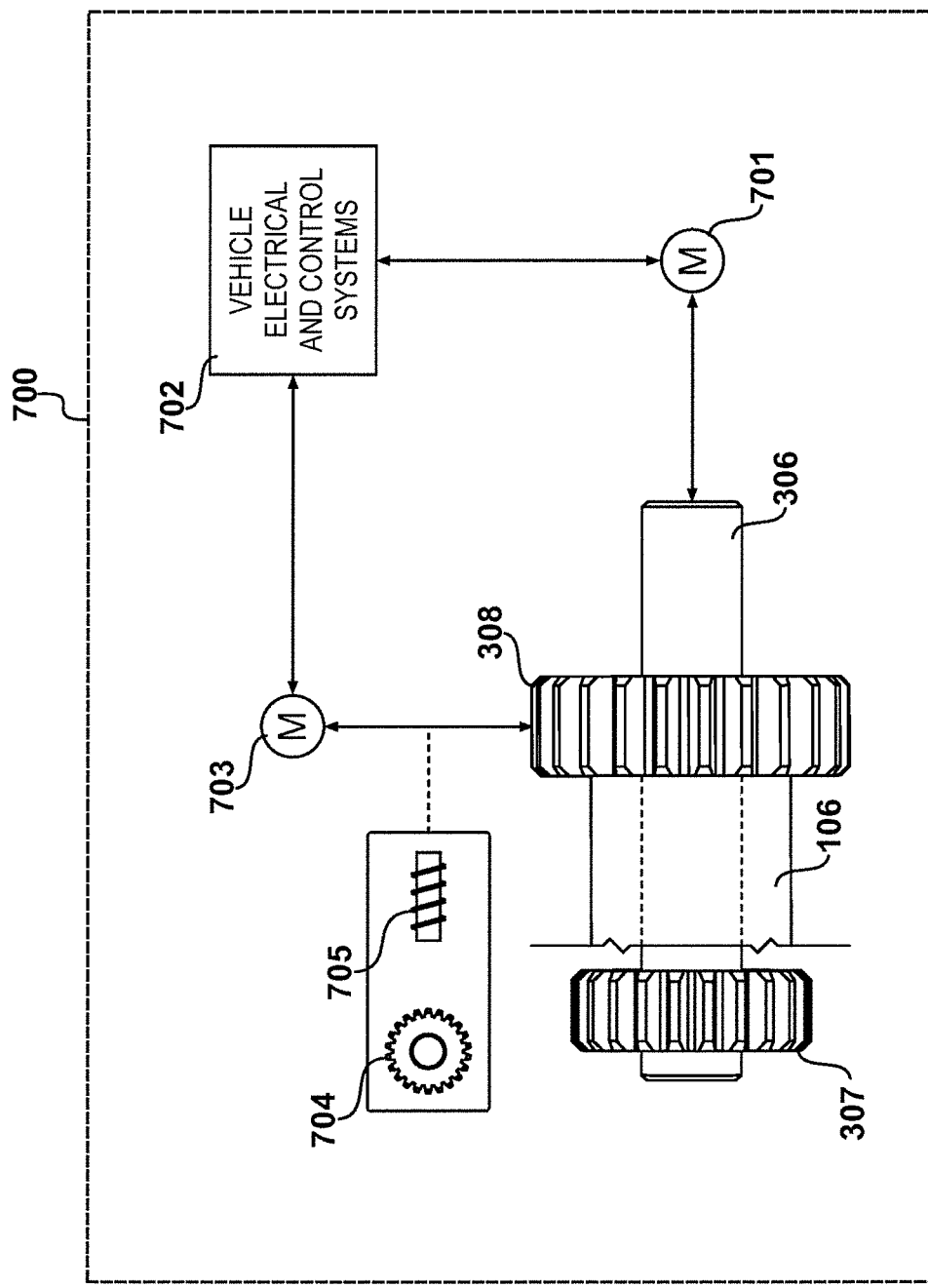
FIG. 7 shows how the centerless wheel of FIG. 1 may be integrated with a vehicle.

The centerless wheel 101 further comprises a connection assembly 107 for connecting the centerless wheel 101 to a vehicle (not shown in FIG. 1 or FIG. 2 but schematically outlined at 700 in FIG. 7). It is envisaged that the connection assembly 107 may form the upright in a substantially conventional suspension system for, say, a road-going vehicle. Alternatively, it may form part of a vehicle with no suspension system, and be directly connected to the chassis thereof, for example a wheelchair.

Whilst not shown in FIGS. 1 and 2, the centerless wheel 101 further comprises an actuator which is configured to rotate the housing 106 relative to the connection assembly 107 around an axis B-B. The aspect of the invention in terms of the presence of the actuator will be described with reference to FIG. 7.

FIG. 3

Figure 3:
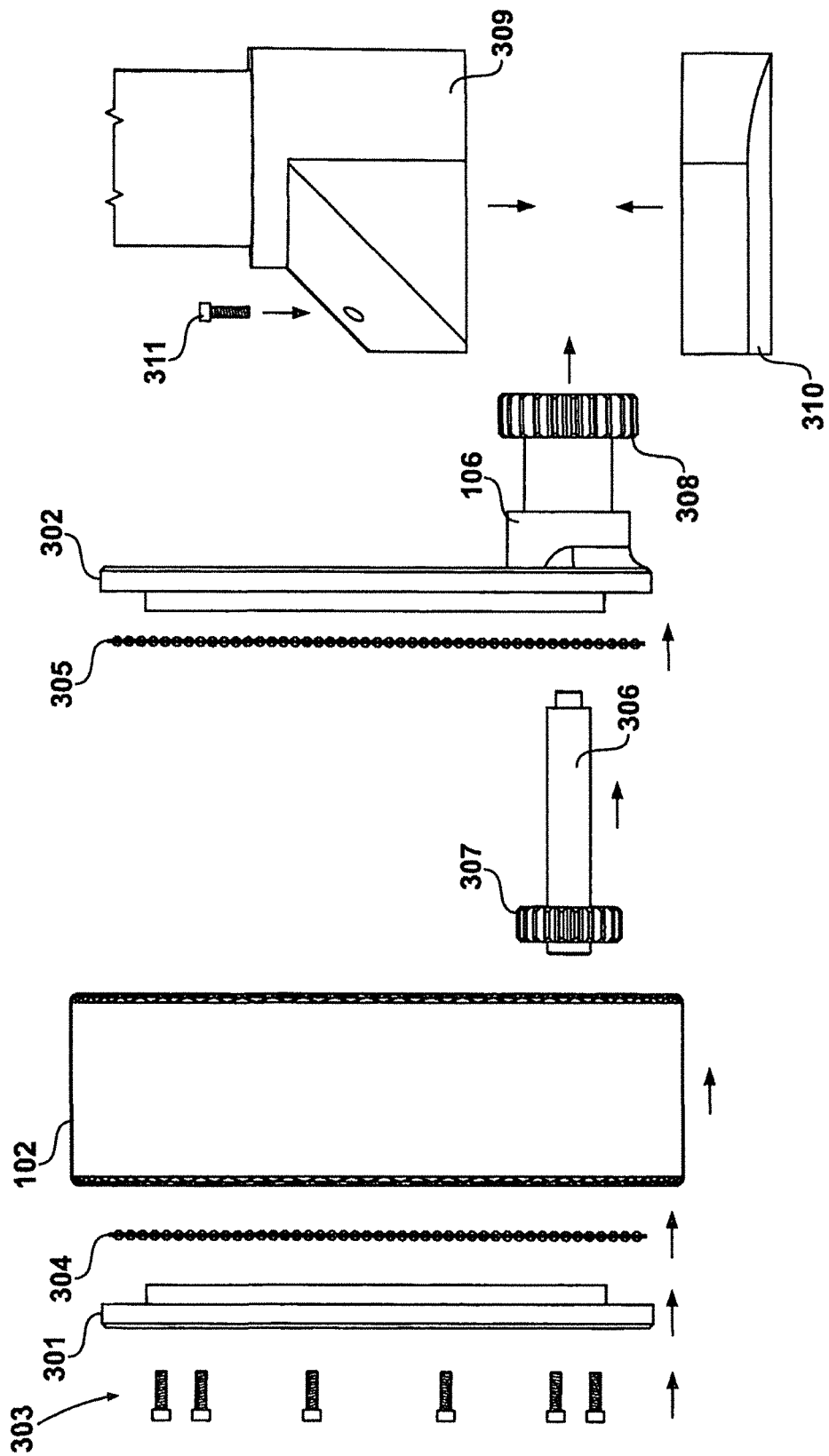
FIG. 3 shows components that are fitted together to form the centerless wheel of FIG. 1.

An illustration of the component parts and how they are brought together to form the centerless wheel 101 is shown in FIG. 3.

The member 105 is, in the present embodiment, a two-piece component comprising an outer half 301 and an inner half 302, the latter of which is integral with the housing 106 for the drive mechanism. The outer and inner halves of the member 105 are joined together around the rotor 102 by fastening elements, which are threaded bolts 303 in the present embodiment. The bolts 303 engage with threads in the inner half 302 of the member 105 to retain the outer half 301 thereto. The releasable connection of the outer half to the inner half means that it may be removed to facilitate servicing, for example.

In the present embodiment, a first set of rolling elements 304 is positioned between the outer half 301 of the member and the rotor 102, whilst a second set of rolling elements 305 is positioned between the inner half 302 of the member and the rotor 102. Thus rolling element bearings are formed so as to allow relative movement between the member and the rotor. The configuration of the member and the rotor to form races will be described further with reference to FIG. 6.

As described previously, the member 105 provides a housing 106 for the drive mechanism of the centerless wheel 101. As shown in FIG. 3, the drive mechanism of the present embodiment comprises a driveshaft 306 having a pinion 307 mounted thereon. As will be described further with reference to FIG. 5, the inner surface 104 of the rotor comprises radial teeth to form an annular gear such that torque may be transmitted to the rotor via the pinion 307. Whilst not shown in FIG. 3, the driveshaft 306 may be directly coupled to a motor mounted in the connection assembly 107 or via a gear system mounted elsewhere on the vehicle, for example.

In order to facilitate relative motion of the member 105 and the connection assembly 107, in the present example the housing 106 comprises a gear 308 arranged in the present embodiment to be encased in the connection assembly 107. In a similar way to the driveshaft 306, an actuator such as a motor mounted in the connection assembly 107 may be provided to act via either a sprocket or a worm on the gear 308. Alternatively, the actuator may be mounted elsewhere on the vehicle with an appropriate transmission system being provided.

The connection assembly 107 in the present embodiment comprises an upper casing 309 and a lower casing 310 which are brought together around the housing 106 and the gear 308 thereon. The upper and lower casings are joined by a fastening element such as a bolt 311 that passes through the upper casing 309 to be threaded into the lower casing 310.

FIG. 4

Figure 4:
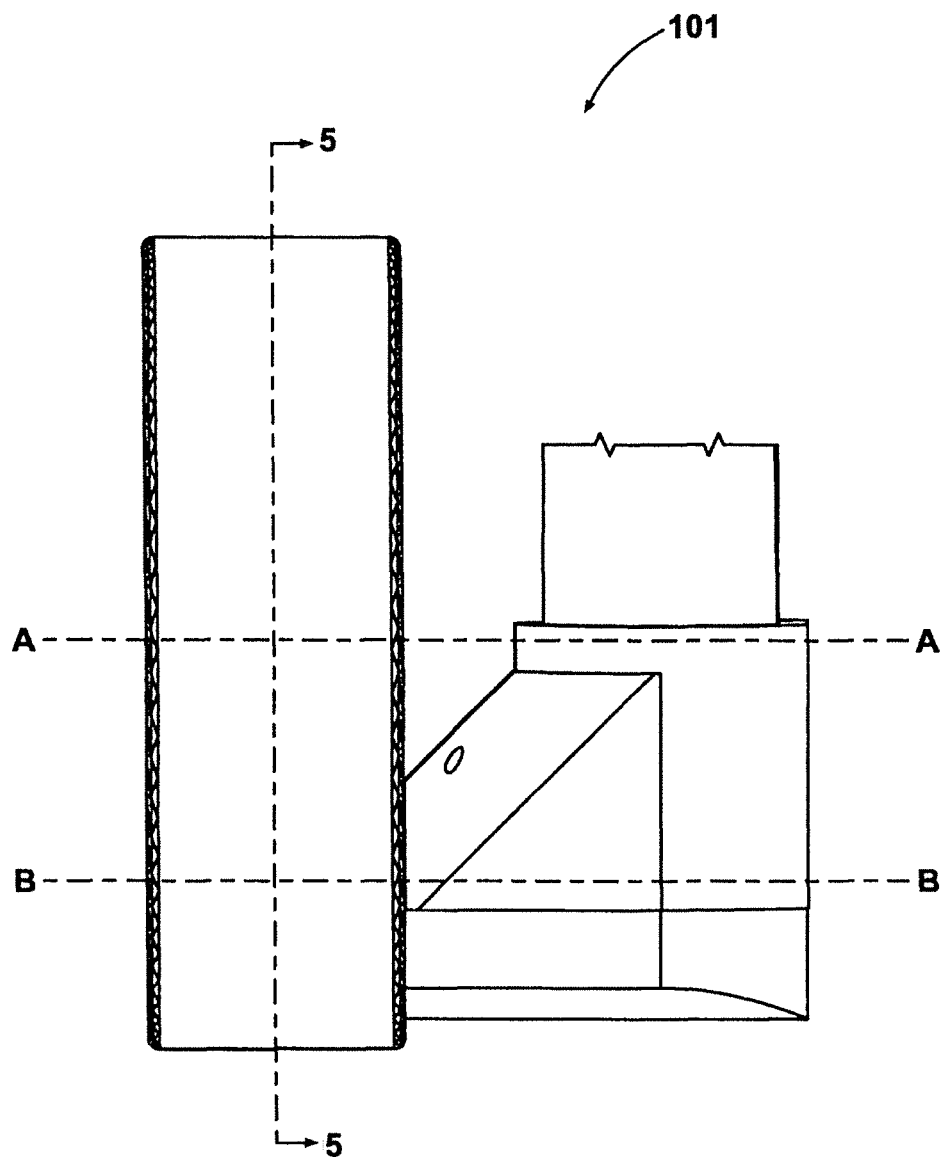
FIG. 4 is a front elevation of the centerless wheel of FIG. 1.

A front elevation of the centerless wheel 101 is shown in FIG. 4, following the completion of the arrangement of components identified in FIG. 3.

FIG. 5

Figure 5:
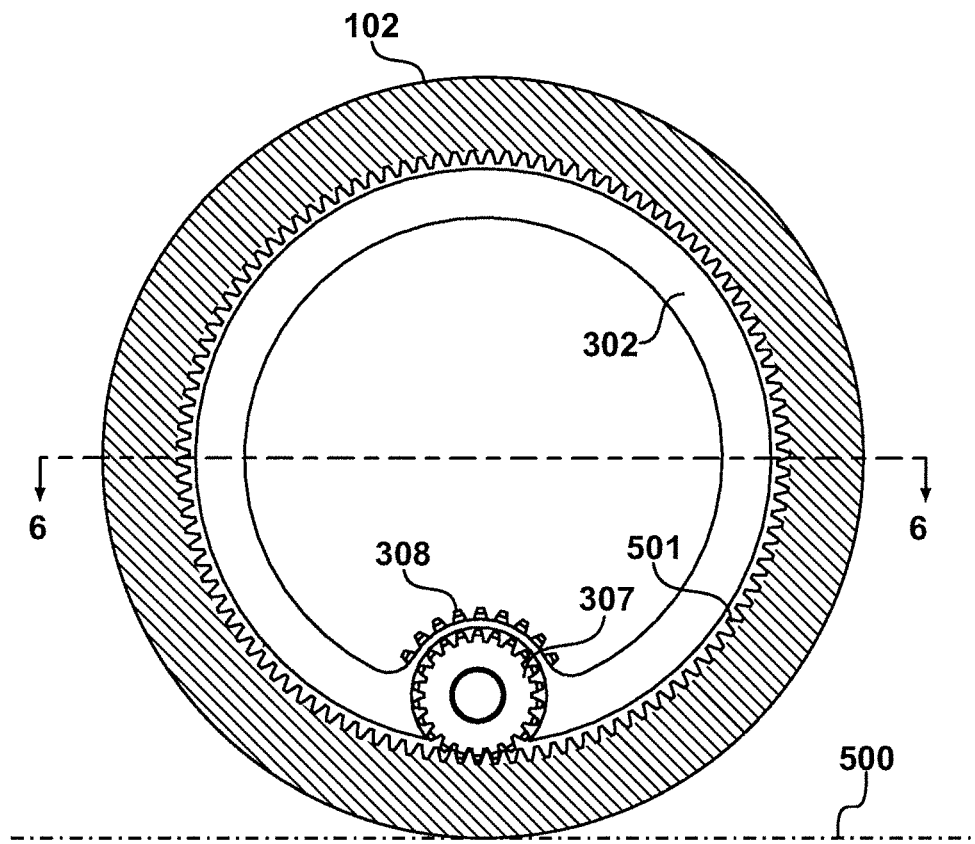
FIG. 5 is a section along line 5-5 of FIG. 4.
Figure 6:
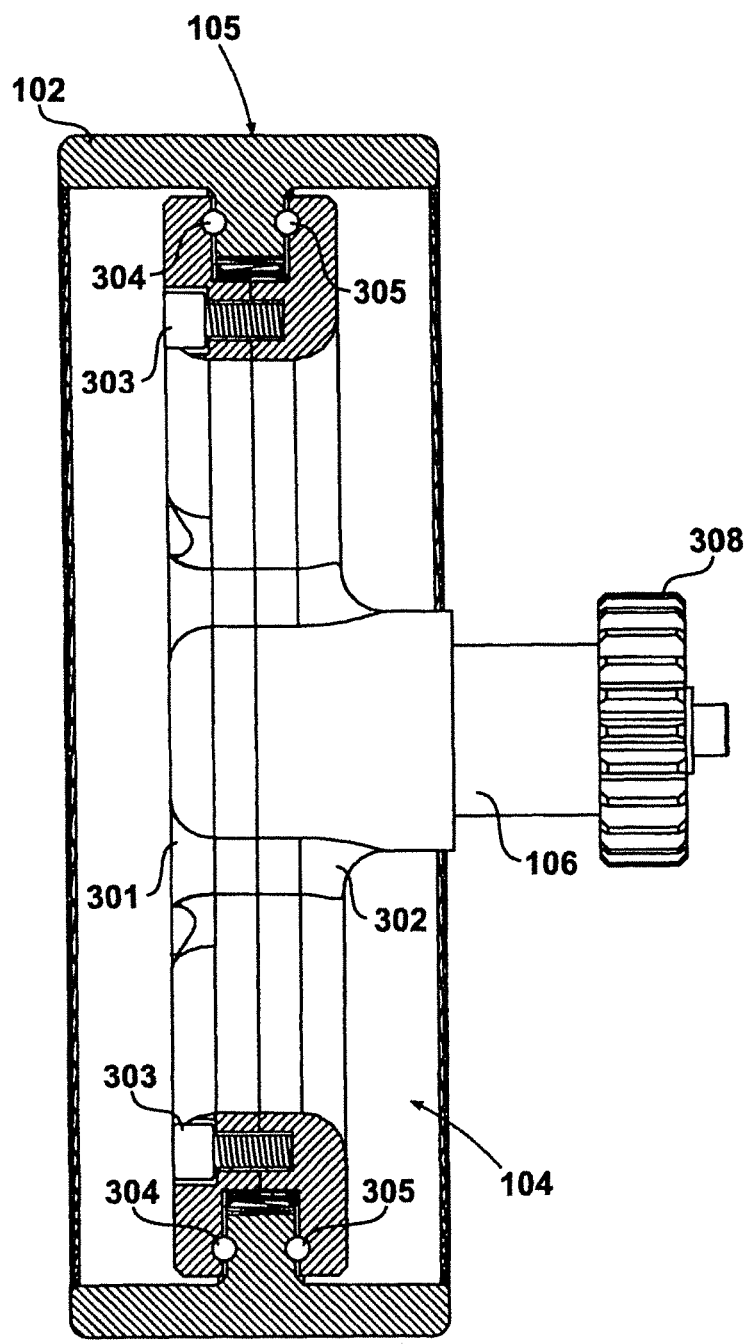
FIG. 6 is a section along line 6-6 of FIG. 5.

A section of the centerless wheel 101 along line 5-5 of FIG. 4 is shown in FIG. 5 with the connection assembly 107 omitted.

As described previously, the inner surface 104 of the rotor 102 comprises radial teeth that form an annular gear 501. The pinion 307 is meshed with the annular gear 501 to transmit drive torque. In the present embodiment, rotation of the member 105 is achieved by an actuator acting upon the gear 308 on the housing 106.

The wheel rests on a supporting surface 500.

FIG. 6

A section of the centerless wheel 101 along line 6-6 of FIG. 5 is shown in FIG. 4 with the connection assembly 107 omitted.

As described previously, a first set of rolling elements 304 is placed between the outer half 301 of the member 105 and the rotor 102, and a second set of rolling elements 305 is placed between the inner half 302 of the member 105 and the rotor 102. The inner and outer halves and the rotor both include grooves on their adjacent faces to provide races for the first and second sets of rolling elements. The grooves on the rotor are located on either side (in the axial direction) of the annular gear 501.

FIG. 7

An illustration of how the centerless wheel 101 may be integrated into a vehicle 700 Is shown in FIG. 7, which vehicle may be for instance a road-going motor vehicle or a wheelchair or a trolley.

It is envisaged that the rotor 102 on the centerless wheel 101 will be driven by an electrical machine 701 via the drive mechanism, i.e. the driveshaft 306 and the pinion 307, so as to facilitate drive in forward and reverse directions, and also regenerative braking. Thus, the electrical machine 701 is configured to be in electrical communication with the vehicle's electrical and control systems 702. In this way, a centerless wheel 101 according to the present invention may be provided at each contact patch of the vehicle, so as to allow skid steer to be used for the vehicle. Alternatively, the wheels may also be configured to pivot using a steering rack of the known type or similar, with control of the electrical machine for each wheel being coordinated to provide torque vectoring.

The motion of the member 105 relative to the connection mechanism 107 of the centerless wheel 101 is, as previously described, facilitated by an actuator. In the present embodiment, the actuator again is an electrical machine 703 for connecting with the vehicle electrical and control systems 702. In the present example, the electrical machine 703 rotates the member by driving the gear 308 on the housing 106 via either a sprocket 704 or a worm 705, either of which may be used depending on the chosen packaging strategy for the wheel. It is envisaged that as an alternative to the gear 308 and the electrical machine 703 for rotary motion, a linear actuator system could be provided within the scope of the present invention so as allow linear movement of the member 105 relative to the connection assembly 107.

FIGS. 8A, 8B & 8C

Figure 8C:
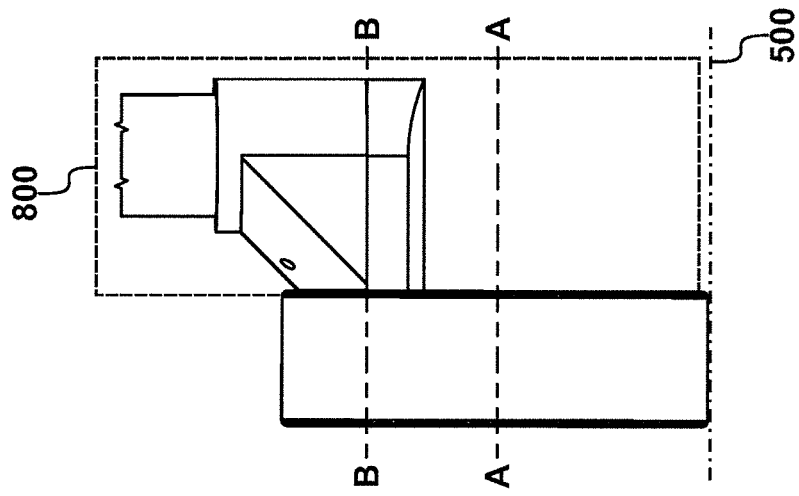
FIGS. 8A, 8B and 8C show the effect of rotating the housing for the drive mechanism of the centerless wheel of FIG. 1.
Figure 8B:
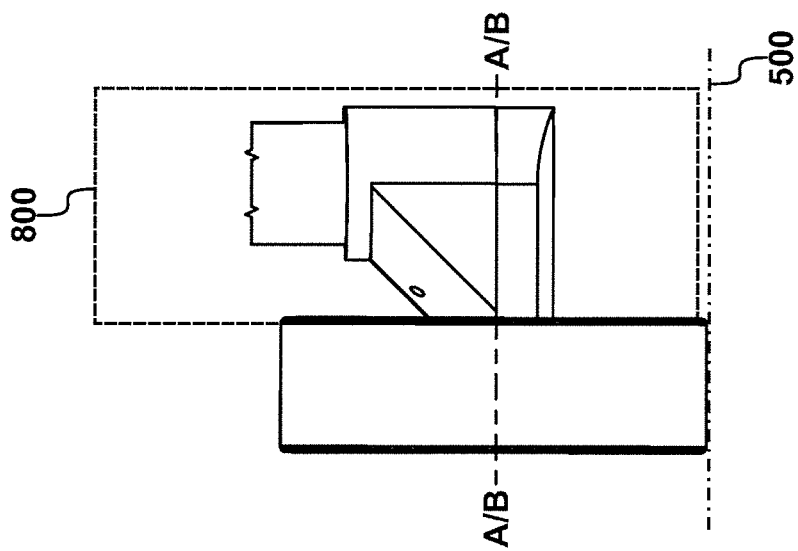
Figure 8A:
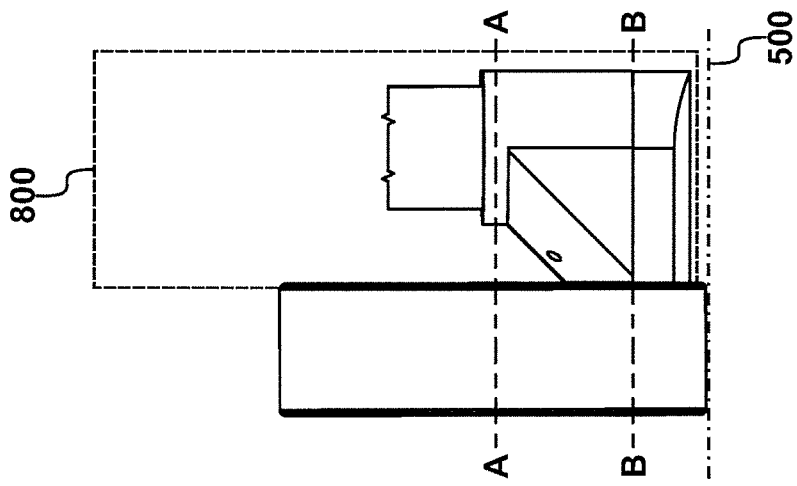

Front elevations of the centerless wheel at different positions of the member 105 relative to the connection assembly 107 are shown in FIGS. 8A to 8C and the effect on the position of the axis of rotation A-A.

The movement of the member 105 relative to the connection assembly 107 provides several benefits. First and foremost, it allows the vehicle's ride height to be raised and lowered. If the connection assembly is mounted higher than the lowest part of the vehicle, then this allows the rotor to be rotated such that it is no longer in contact with the ground, which avoids the need for jacking systems. Second, integration with a ride height sensor and coordination with the drive electrical machine 701 allows active suspension to be provided, with the added benefit of upward motion against the rotor 102 providing a degree of energy recovery via the electrical machine 703. Finally, locomotion purely by the electrical machine 703 may be achieved to rotate the rotor 102 around axis B-B which has application for vehicles that need to climb flights of stairs.

The wheel rests on a supporting surface 500.

Further, the connection assembly is configured to form part of an upright 800 in a suspension system of a vehicle.

What is claimed is:

1. A centerless wheel for a vehicle, comprising:
a rotor that is annular around an axis, and having an outer surface for engagement with a supporting surface, and an inner surface having a first plurality of radial teeth to form an annular gear;
an annular member that is annular around said axis and in which the rotor is mounted, and having a housing for a drive mechanism comprising:
a driveshaft with a pinion mounted on the driveshaft in engagement with said annular gear to transmit torque to the rotor for rotating the rotor, and
a second plurality of radial teeth on the housing to form a gear which is spaced away from said first plurality of radial teeth of the rotor and the pinion of the annular member,
both the first and second plurality of radial teeth together being operational for rotating the rotor;
a connection assembly for connecting the annular member to the vehicle;
an actuator acting upon the housing to rotate the annular member and the rotor relative to the connection assembly;
wherein the actuator engages with the second plurality of radial teeth to rotate the driveshaft which in turn causes the pinion to engage with the first plurality of teeth to rotate the centerless wheel with respect to the connection assembly.

2. The centerless wheel of claim 1, wherein said actuator comprises a first electrical machine having one of:
a sprocket for engagement with said gear on the housing; or
a worm for engagement with said gear on the housing.

3. The centerless wheel of claim 2, wherein the connection assembly includes a second electric machine in connection with the drive mechanism for driving the rotor.

4. The wheel of claim 1, wherein the connection assembly forms part of an upright in a suspension system of the vehicle.

5. The centerless wheel of claim 1, wherein the rotor comprises a friction material on an outer surface thereof.

6. The centerless wheel of claim 5, wherein the friction material is a rubber tire.

7. The centerless wheel of claim 1, wherein the annular member is formed of an inner half carrying the housing and an outer half that is releasably connected to the inner half.

8. The centerless wheel of claim 1, for use with one of:
a road-going motor vehicle;
a wheelchair; or
a trolley.

* * * * *